United States Patent [19]
Akimoto

[11] Patent Number: 6,164,705
[45] Date of Patent: Dec. 26, 2000

[54] COMBINATION OF PIPES AND GASKET FOR CONNECTION THEREOF

[75] Inventor: Noriaki Akimoto, Tokyo, Japan

[73] Assignee: Ishikawa Gasket Co., Ltd., Tokyo, Japan

[21] Appl. No.: 09/276,124

[22] Filed: Mar. 25, 1999

[30]       Foreign Application Priority Data

Apr. 8, 1998  [JP]  Japan .................................. 10-112828

[51] Int. Cl.$^7$ .................................................... F16L 17/06
[52] U.S. Cl. .................. 285/110; 285/332.3; 285/334.4; 285/334.5; 285/917
[58] Field of Search .................................... 285/917, 111, 285/110, 332.3, 334.4, 334.5

[56]             References Cited

U.S. PATENT DOCUMENTS

| | | | |
|---|---|---|---|
| 2,259,940 | 10/1941 | Nathan | 285/110 |
| 2,415,339 | 2/1947 | Curtis | 285/110 |
| 2,434,107 | 1/1948 | Folsom | 285/110 |
| 3,799,586 | 3/1974 | Caras | 285/111 |
| 4,293,149 | 10/1981 | Bonel | 285/111 |
| 4,662,173 | 5/1987 | Wilkinson . | |
| 4,778,203 | 10/1988 | Bartholomew | 285/111 |
| 5,076,594 | 12/1991 | Baugh . | |
| 5,505,498 | 4/1996 | Halling | 285/111 |

FOREIGN PATENT DOCUMENTS

| | | | |
|---|---|---|---|
| 464253 | 4/1950 | Canada | 285/111 |
| 21 56 713 | 5/1973 | Germany . | |
| 49-51443 | 5/1974 | Japan . | |
| 10-48381 | 2/1998 | Japan . | |
| 1000312 | 8/1965 | United Kingdom | 285/111 |

*Primary Examiner*—Dave W. Arola
*Attorney, Agent, or Firm*—Kanesaka & Takeuchi

[57]              ABSTRACT

Pipes are securely connected by an annular gasket. The gasket includes an inner portion, an outer portion situated radially outwardly of the inner portion, and a resilient connecting portion for connecting the inner and outer portions at one side of the gasket. The pipes to be connected includes male and female pipes. The male pipe has a first engaging section to be engaged with the inner portion of the gasket, and the female pipe for receiving therein the male pipe has a second engaging section at one side thereof. The second engaging section engages the outer portion of the gasket while restricting movement of the gasket when the gasket and the pipes are engaged together.

5 Claims, 1 Drawing Sheet

COMBINATION OF PIPES AND GASKET FOR CONNECTION THEREOF

BACKGROUND OF THE INVENTION AND RELATED ART STATEMENT

The present invention relates to a combination of pipes and a gasket installed between the pipes for connecting the same. In particular, manifold pipes of an automobile are securely sealed by the gasket.

Conventionally, when pipes are connected together, flanges are attached to the end portions of the pipes, and the flanges are connected or tightened together with a gasket therebetween. However, since the flanges have to be formed on the pipes, it takes an additional labor and cost. Therefore, the formation of the flanges is not practical.

In case the pipes are male and female pipes engaging with each other, a gasket formed of heat resisting resin or heat resisting rubber may be disposed between the male and female pipes. However, although it is simple in connecting the pipes, since the manifold pipe is heated in use to very high temperature, the gasket made of the heat resisting resin or rubber may not sufficiently seal between the pipes.

In Japanese Patent Publication (KOKAI) No. 49-51443 corresponding to U.S. patent application Ser. No. 269,936 filed on Jul. 10, 1972, an annular gasket is used to connect plastic tubes. The annular gasket is made of a thermoplastic resin, and includes inner and outer portions connected by a base portion. Since the gasket is disposed between two plastic pipes with different diameters or inclined surfaces, the gasket may not be fixed or positioned to the pipes. Also, since the gasket is made of a thermoplastic resin, the gasket is not suitable to the manifold gasket.

In Japanese Patent Publication (KOKAI) No. 10-48381, a metal seal 22 formed of a main portion 22a and a flange 22b is disposed between two members 70, 80 with a ring 33. The metal seal 22 provides resiliency, but it does not directly seal between two members.

In view of the foregoing, the present invention has been made, and an object of the invention is to provide a combination of pipes and a metal gasket for connecting the pipes exposed to high temperature easily and securely.

Another object of the invention is to provide a combination as stated above, wherein the gasket can be easily positioned relative to the pipes.

A further object of the invention is to provide a combination as stated above, wherein a proper sealing pressure can be applied to the gasket to securely seal between the pipes.

Further objects and advantages of the invention will be apparent from the following description of the invention.

SUMMARY OF THE INVENTION

In the invention, pipes, such as manifold pipes, to which high temperature is applied, are sealed by an annular metal gasket. The gasket includes an inner portion, an outer portion situated radially outwardly of the inner portion, and a resilient connecting portion. The connecting portion connects the inner and outer portions and is situated at one side of the gasket. The annular gasket has a V-shape or a U-shape in a cross section, so that ends of the inner and outer portions at a side opposite to the connecting portion open outwardly.

The pipes to which the gasket is installed include a male pipe having a first engaging section to be engaged with the inner portion of the gasket, and a female pipe for receiving the male pipe therein to engage the male pipe. The female pipe has a second engaging section at one side thereof. The second engaging section engages the outer portion of the gasket, while the second engaging section restricts movement of the gasket when the gasket and the pipes are engaged together. Accordingly, the pipes can be securely connected together by the gasket.

Generally, when a male pipe is inserted into a female pipe with a gasket therebetween, the gasket may not be positioned properly between the male and female pipes. In this case, the proper sealing pressure may not be applied to the gasket, so that the sealing pressure may be too high or too low.

In the invention, since the gasket is properly positioned between the male and female pipes, the proper sealing pressure can be applied to the gasket to securely seal between the male and female pipes. Also, the pipes and the gasket can be easily installed or assembled together.

In one aspect of the invention, the first engaging section of the male pipe is tapered toward an end thereof, while the female pipe extends linearly and has an annular groove with a bottom extending from an end of the female pipe at an inner side thereof. In this case, the gasket is disposed in the groove so that at least the end of the outer portion engages the bottom of the groove to prevent movement of the gasket.

In another aspect of the invention, the male pipe includes a main cylindrical portion, and a front cylindrical portion. The first engaging section extends from the main portion to taper therefrom, and the front cylindrical portion extends from the first engaging section. The diameter of the front cylindrical portion is less than that of the main cylindrical portion.

Also, the female pipe includes a main cylindrical portion having a diameter greater than that of the front cylindrical portion. The second engaging section extends obliquely outwardly from the main cylindrical portion of the female pipe. When the pipes are assembled, the front cylindrical portion is located in the main cylindrical portion of the female pipe, and the gasket is disposed between the first and second engaging sections to securely seal therebetween. Preferably, the inclination angles of the first and second engaging sections are substantially equal to be arranged parallel to each other.

When the pipes are fixed to other members, such as a body of an automobile, the gasket is held in the compressed condition to securely seal between the first and second engaging sections.

DETAILED DESCRIPTION OF PREFERRED EMBODIMENTS

Figure 1:
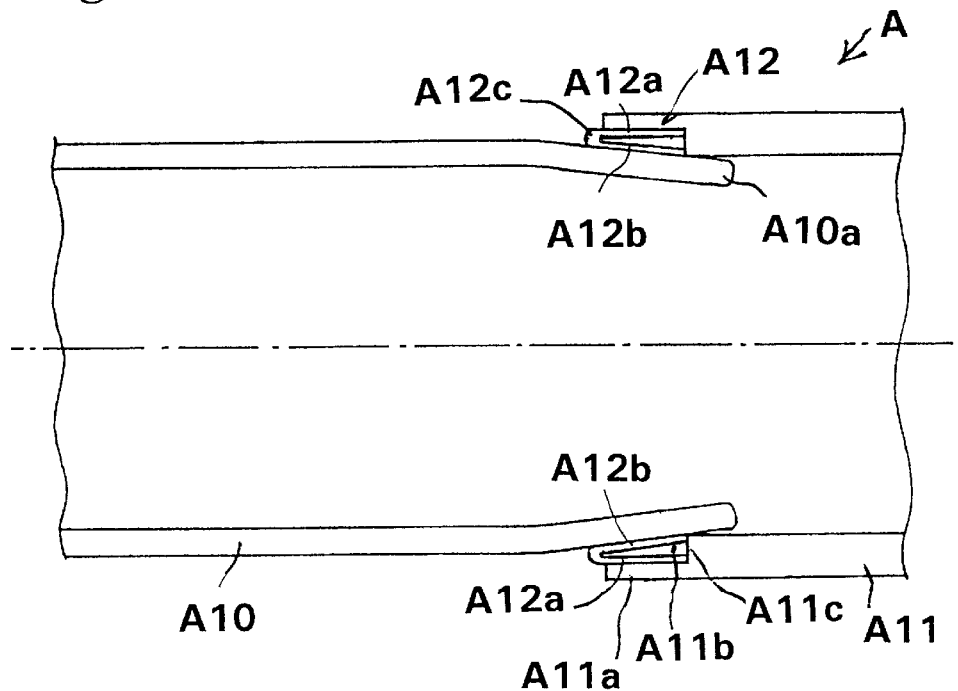
FIG. 1 an explanatory sectional view of a first embodiment of a combination of pipes and a gasket of the invention.

With reference to the drawings, the present invention will be explained in detail. FIG. 1 is an explanatory sectional view of a first embodiment A of the invention, wherein a male pipe A10 is inserted into a female pipe A11 and is sealed to the female pipe A11 through a gasket A12. The male and female pipes A10, A11 are exhaust pipes for an internal combustion engine and are made of metal, such as stainless steel.

The male pipe A10 includes a tapered end portion A10a at one end. The female pipe A11 has an end portion A11a having a diameter greater than the outer diameter of the tapered end portion A10a, and includes an annular groove A11b inside the female pipe. The annular groove A11b extends from an end of the female pipe A11 and has a bottom or end A11c arranged perpendicular to the longitudinal axis of the female pipe A11.

The outer diameter of the male pipe A10 at the tapered end portion A10a is slightly less than the inner diameter of the end portion A11a of the female pipe A11, i.e. end A11c. Thus, the tapered end portion A10a of the male pipe A10 can be inserted into the female pipe A11.

The gasket A12 is formed of an outer portion A12a, an inner portion A12b, and a connecting portion A12c between the outer and inner portions A12a, A12b, which are arranged to have a V-shape with an open end at a side opposite to the connecting portion A12c. The gasket A12 is made of metal, such as stainless steel, and has a resiliency.

The lateral length or width of the outer portion A12a is substantially the same as that of the inner portion A12b. However, the inner portion A12b may have a lateral length less than that of the outer portion A12a. In any situation, the inner portion A12b can be moved into or located in the annular groove A11b.

When the pipes A10, A11 are connected together with the gasket A12, the gasket A12 is disposed in the annular groove A11b. In this condition, the inner portion A12b projects inwardly of the female pipe A11. Then, the end portion A10a of the male pipe A10 is inserted into the end portion A11a of the female pipe A11, while the inner portion A12b is urged inwardly. The male pipe A10 is disposed to a position such that the outer surface of the male pipe A10 contacts the edge of the corner of the bottom A11c.

In the invention, when the male pipe A10 is inserted into the female pipe A11, since the outer portion A12a engages the bottom A11c, the gasket A12 is not moved in the female pipe A11. Thus, the location of the gasket A12 is fixed. Also, when the male pipe A10 is being inserted into the female pipe A11, the inner portion A12b is urged outwardly to thereby securely seal between the male and female pipes A10, A11.

In the invention, the connecting portion A12c of the gasket A12 is located outside the female pipe A11. Therefore, when the male and female pipes A10, A11 are firmly engaged together, the pressure is not concentrated at the connecting portion A12c. Namely, the male and female pipes A10, A11 are engaged with slight resiliency. If the male and female pipes A10, A11 are required to be engaged firmly, the connection portion A12c may be located inside the groove A11b.

In the above embodiment, the gasket A12 is, at first, located in the groove A11b, but if there is a space between the outer portion A12a of the gasket A12 and the inner wall of the groove A11b, the gasket A12 may be disposed on the male pipe A10, first, and the male pipe A10 with the gasket A12 may be inserted into the female pipe A11 such that the gasket A12 is disposed in the groove A11b.

Figure 2:
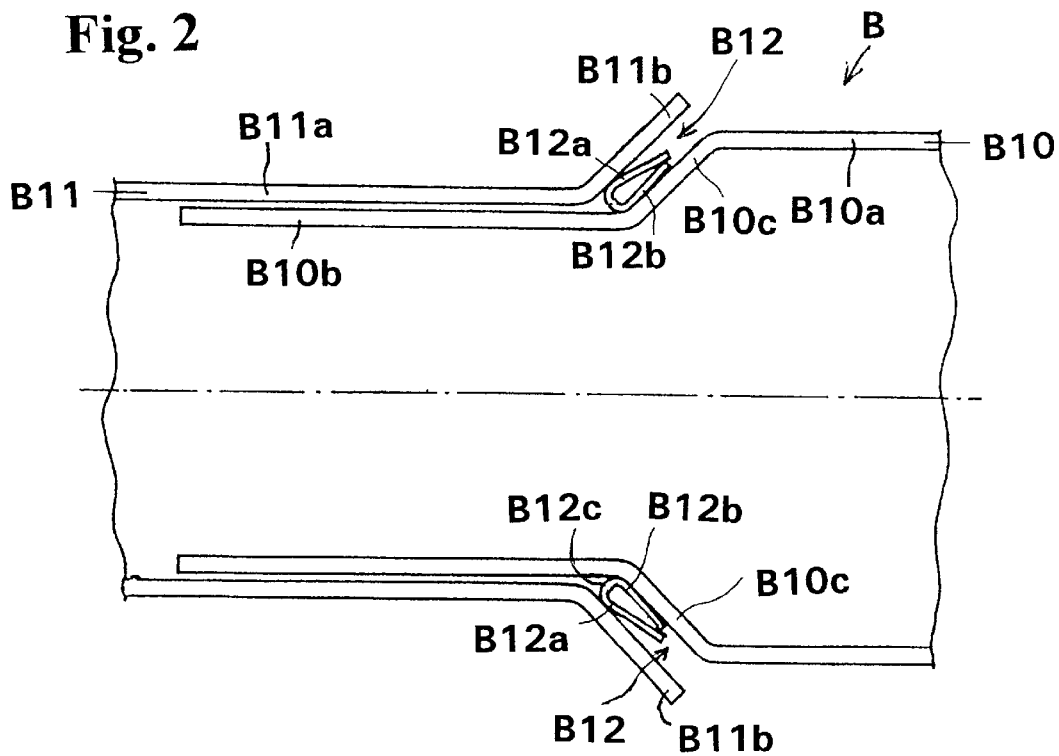
FIG. 2 is an explanatory sectional view of a second embodiment of the invention.

FIG. 2 is an explanatory sectional view of a second embodiment B of the invention, wherein a male pipe B10 is inserted into a female pipe B11 and is sealed by a metal gasket B12.

The male pipe B10 includes a base portion B10a, a front portion B10b, and a tapered portion B10c between the base portion B10a and the front portions B10b. The diameter of the front portion B10b is less than that of the base portion B10a.

The female pipe B11 has a base portion B11a, and an end portion B11b extending outwardly obliquely from the base portion B11a. The inner diameter of the base portion B11a of the female pipe B11 is slightly greater than the outer diameter of the front portion B10b of the male pipe B10. Thus, the front portion B10b of the male pipe B10 can be inserted into the female pipe B11. The end portion B11b and the tapered portion B10c are inclined substantially parallel to each other.

The gasket B12 is formed of an outer portion B12a, an inner portion B12b, and a connecting portion B12c between the outer and inner portions B12a, B12b, which are arranged to have a U-shape in a non-compressed condition. Incidentally, in FIG. 2, since the gasket B12 is compressed between the end portion B11b and the tapered portion B10c, the gasket B12 is deformed as shown in the drawing.

When the pipes are assembled together with the gasket, the gasket B12 is disposed on the male pipe B10. Then, the front portion B10b of the male pipe B10 is inserted into the female pipe B11. Thus, the gasket B12 is held between the end portion B11b and the tapered portion B10c without displacement or movement.

In the embodiment as shown in FIG. 2, when the male and female pipes B10, B11 are held or fixed relative to each other, the gasket B12 is compressed to securely seal between the male and female pipes B10, B11. The gasket B can operate and seal, similar to the gasket A.

In connecting the pipes, in the invention, the gasket can be held in place between the two pipes by the simple structure, and can securely seal between the two pipes.

While the invention has been explained with reference to the specific embodiments of the invention, the explanation is illustrative, and the invention is limited only by the appended claims.

What is claimed is:

1. A combination of pipes and a gasket for connecting the pipes, comprising:

an annular metal gasket having an inner portion, an outer portion situated radially outwardly of the inner portion, and a resilient connecting portion for connecting the inner and outer portions and situated at one side of the gasket to have one of a V-shape and a U-shape in a cross section so that ends of the inner and outer portions at a side opposite to the connecting portion open outwardly, a male pipe having a first engaging section tapering toward an end thereof to engage the inner portion of the gasket, and a female pipe for receiving the male pipe therein to engage the male pipe and including an outer end, an annular groove extending from the outer end at an inner side thereof and having an end, and a second engaging section at one side thereof, said gasket being disposed in the groove so that at least the end of the outer portion engages the end of the groove to prevent movement of the gasket, said second engaging section engaging the outer portion of the gasket while restricting movement of the gasket when the gasket and the pipes are engaged together.

2. A combination according to claim 1, wherein said resilient connecting portion is disposed outside the female pipe.

3. A combination of pipes and a gasket for connecting the pipes, comprising:

a male pipe having a main cylindrical portion, a tapered portion tapering from the main portion to form a first engaging section, and a front cylindrical portion extending from the tapered portion and having a diameter less than that of the main cylindrical portion, said main cylindrical portion, tapered portion and front cylindrical portion being integrally formed by said male pipe as one unit, a female pipe including a main cylindrical portion having an inner diameter greater than an outer diameter of the front cylindrical portion, and an end portion extending obliquely outwardly from the main cylindrical portion to form a second engaging section, said main cylindrical portion and end portion of the female pipe being integrally formed by said female pipe as one unit, said main cylindrical portion of the female pipe, when the male and female pipes are connected, receiving the front cylindrical portion so that the first and second engaging sections face each other, and an annular metal gasket having an inner portion, an outer portion situated radially outwardly of the inner portion, and a resilient connecting portion for connecting the inner and outer portions and situated at one side of the gasket to have one of a V-shape and a U-shape in a cross section so that ends of the inner and outer portions at a side opposite to the connecting portion open outwardly, said gasket being sandwiched between the first and second engaging sections such that the first and second engaging sections contact the inner and outer portions of the gasket respectively while the resilient connecting portion is located radially inwardly of the gasket and situated adjacent to the front cylindrical portion.

4. A combination according to claim 3, wherein when the male and female pipes are connected, said resilient connecting portion of the gasket is located at a connecting portion between the front cylindrical portion and the tapered portion of the male pipe, and near a connecting portion between the main cylindrical portion and the end portion of the female pipe.

5. A combination according to claim 3, wherein inclination angles of the first and second engaging sections are substantially equal to be arranged parallel to each other.

* * * * *